July 3, 1962 — E. FEIGIN — 3,041,730
DIP STICK WIPER
Filed April 13, 1959 — 2 Sheets-Sheet 1
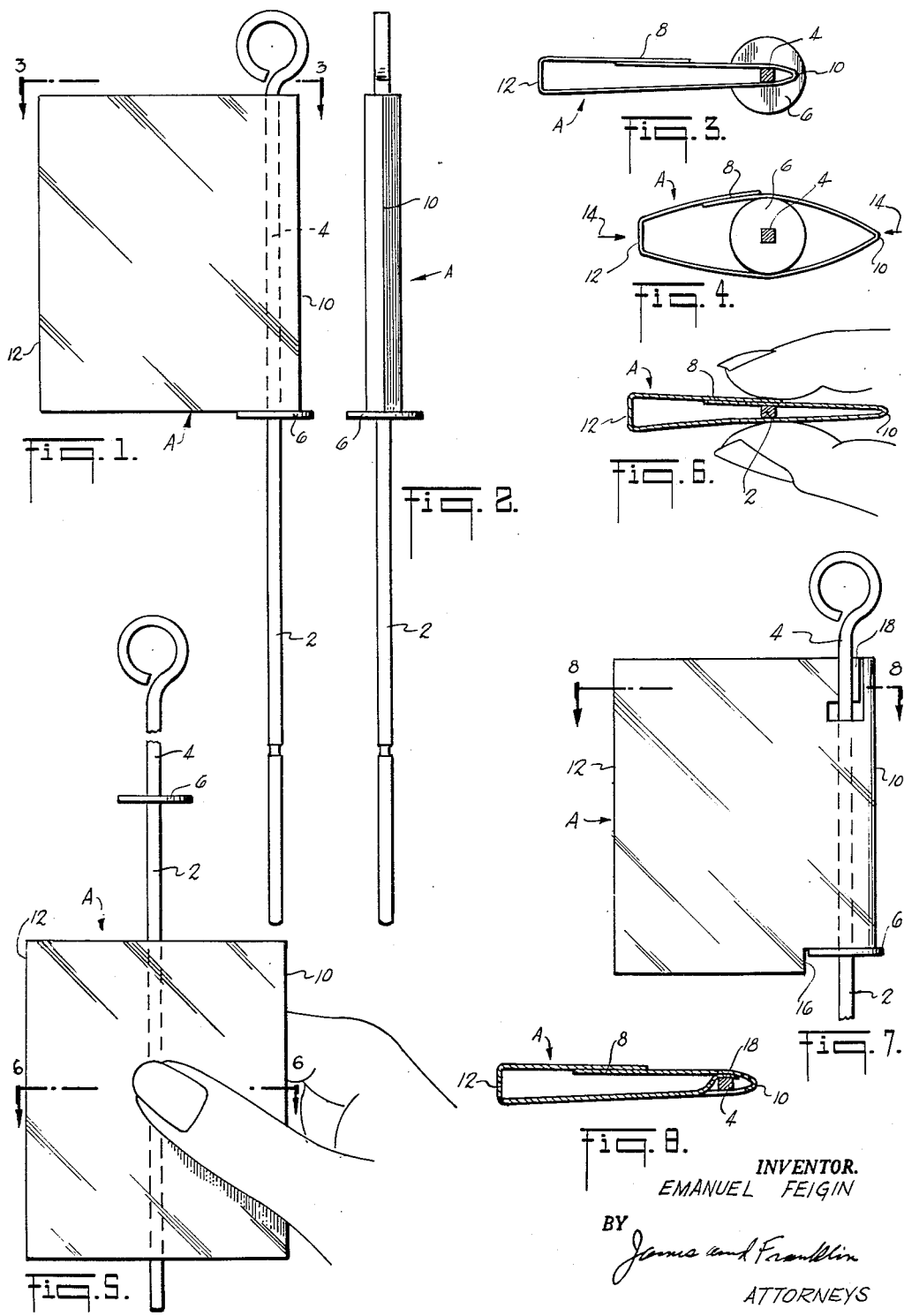
INVENTOR.
EMANUEL FEIGIN
BY James and Franklin
ATTORNEYS July 3, 1962 E. FEIGIN 3,041,730
DIP STICK WIPER
Filed April 13, 1959 2 Sheets-Sheet 2
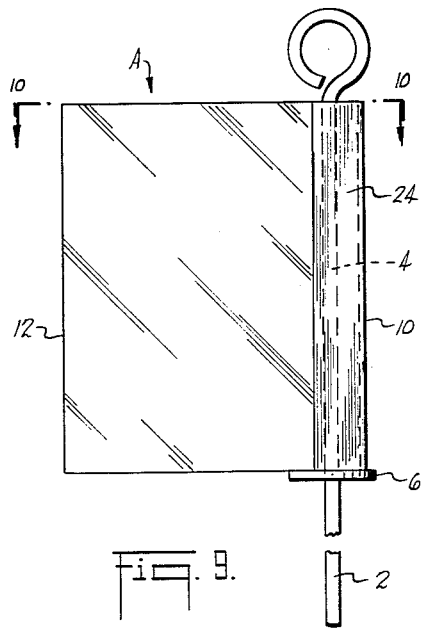
Fig. 9.
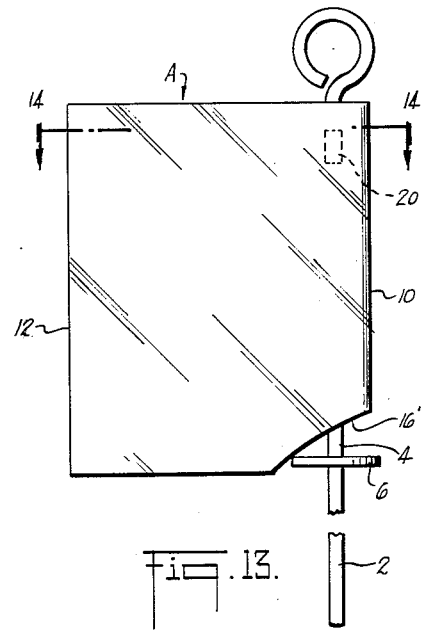
Fig. 13.
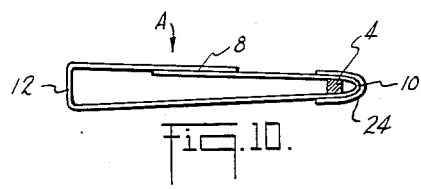
Fig. 10.
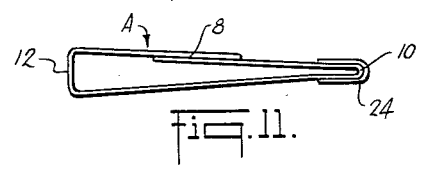
Fig. 11.
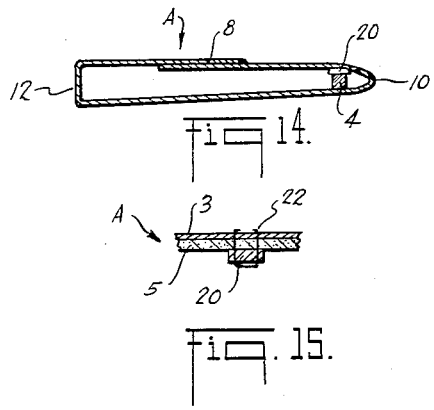
Fig. 14.
Fig. 15.
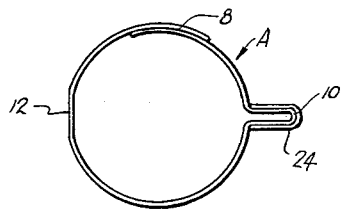
Fig. 12.
INVENTOR.
EMANUEL FEIGIN
BY James and Franklin
ATTORNEYS

United States Patent Office 3,041,730
Patented July 3, 1962

3,041,730
DIP STICK WIPER
Emanuel Feigin, 19 Castle House Drive,
Dobbs Ferry, N.Y.
Filed Apr. 13, 1959, Ser. No. 806,166
12 Claims. (Cl. 33—126.7)

The present invention relates to a device to be attached to dip sticks of the type utilized to measure the amount of oil in automobile crankcases, and in particular to such a device which can be used to wipe the dip stick clean so that it can be used for measurement purposes.

The practical problems involved in measuring the amount of oil in an automobile crankcase are familiar to all. A stick is provided which is normally inserted into the crankcase through an opening provided for that purpose. While the car is in use oil splashes on the stick, and therefore the stick must be cleaned before it can be used for measurement purposes. Ordinarily the stick is withdrawn from the crankcase by a service station attendant, is wiped on a rag (which may or may not be conveniently located), and then is inserted into the crankcase for measurement purposes, after which it is withdrawn for observation. The level of oil in the crankcase is indicated by the height to which oil covers the stick. The wiping of the stick, so essential if accurate measurement is desired, is a source of inconvenience and trouble, and often involves considerable effort on the part of the attendant, particularly where the wiping rag is not readily available.

Proposals have been made in the past for wipers adapted to be used with dip sticks of the type under discussion and which are more or less permanently attached thereto or associated therewith. These devices may be generally characterized as excessively complicated and expensive in comparison with the simple task which they are designed to perform. They have therefore been used only to a most inappreciable degree.

In accordance with the present invention a simple and inexpensive wiper structure is provided which is designed to be more or less permanently associated with the dip stick, and which is always readily available for stick wiping purposes when that is desired. When wiping of the stick is not to take place, which is the case for most of the time, the wiper is held in place on the dip stick in a reliable manner ready for use but retained against undesired displacement. Even then it serves an advantageous purpose. It functions as an indicator to show the location of the dip stick, a matter which is of considerable importance when it is considered that each car model has the dip stick in a different location, sometimes rather remote from ready visual access, and when it is considered that dip stick manipulation is often called for at night or at inadequately illuminated locations.

Dip sticks usually comprise a lower measuring surface adapted to be received within the crankcase, an upper handle portion extending out from the crankcase, and a wider intermediate portion which closes the crankcase opening through which the stick extends and limits the degree to which the stick can be inserted into the crankcase. The wiper of the present invention is designed to be normally positioned on the upper handle portion of the stick and to remain in that position even when the stick is withdrawn from the crankcase, but is manipulatable so as to be moveable into wiping position relative to the lower stick portion. In the forms here specifically disclosed the wiper comprises a loop which normally assumes a flattened configuration smaller in one direction than the width of the intermediate dip stick portion so that it will seat on, and not more downwardly past, that intermediate dip stick portion. However, the loop is resiliently distortable so as to pass over the intermediate dip stick portion into encompassing relation with the lower stick portion, where it can be used to clean the stick. Then, by another and similar resilient distortion, it can be moved upwardly over the intermediate stick portion into seated position on the stick handle portion, after which the dip stick can be used to measure the oil contents of the crankcase.

In various embodiments means are provided to facilitate the retention of the loop on the upper handle portion of the dip stick. Such means may comprise a magnet, a friction tab or other means detachably cooperable with the upper dip stick portion, resilient means to cause the loop in its normal condition to frictionally grip the upper dip stick portion, and cutaway portions on the lower portion of the loop into which the intermediate dip stick portion is adapted to seat to prevent lateral displacement of the loop. The outer surface of the loop may be formed of some reflective material, such as metal foil, so that even with a minimal amount of illumination the location of the loop and consequently of the dip stick itself, will readily be apparent. Suitable indicia may be inscribed on the outer surface of the loop for advertising purposes or to record suitable operating data, such as the mileage when the last oil change was made. The item is sufficiently inexpensive so that it can be given away free as an advertising premium, but it is not a toy, and will perform its wiping function in an effective manner.

To the accomplishment of the above, and to such other objects as may hereinafter appear, the present invention relates to the construction of a wiper for use in combination with a dip stick, as defined in the appended claims, and as defined in this specification, taken together with the following drawings, in which:

FIG. 1 is a front elevational view of a type of dip stick with one embodiment of the wiper of the present invention positioned thereon in stand-by condition;

FIG. 2 is a side elevational view thereof;

FIG. 3 is a cross-sectional view taken along the line 3—3 of FIG. 1;

FIG. 4 is a cross-sectional view similar to FIG. 3 but showing the loop distorted to the position it will assume as it passes over the wider intermediate portion of the dip stick;

FIG. 5 is a view similar to FIG. 1 showing the wiper in wiping use;

FIG. 6 is a cross-sectional view taken along the line 6—6 of FIG. 5;

FIG. 7 is a view similar to FIG. 1 but showing an alternative wiper embodiment;

FIG. 8 is a cross-sectional view taken along the line 8—8 of FIG. 7;

FIG. 9 is a view similar to FIG. 1 but showing still another embodiment of the present invention;

FIG. 10 is a cross-sectional view taken along the line 10—10 of FIG. 9;

FIG. 11 is a view similar to FIG. 10 but showing the position which the wiper assumes before it is applied to the dip stick;

FIG. 12 is a view similar to FIG. 11 and showing the manner in which that embodiment is distorted to pass over the wider intermediate portion of the dip stick;

FIG. 13 is a view similar to FIG. 1 but of yet another embodiment of the present invention;

FIG. 14 is a cross-sectional view taken along the line 14—14 of FIG. 13; and

FIG. 15 is a detail view showing the manner in which a magnet may be attached to the inner surface of the wiper and also illustrating a preferred multi-ply construction for the loop which could be employed in any of the illustrated embodiments.

Dip sticks of the type used to measure the oil contents of a crankcase generally comprise a lower portion 2 of a length sufficient to penetrate the crankcase and sense the level of oil therein, an upper or handle portion 4, and a wider intermediate portion 6 which engages with the crankcase housing, closes the opening through which the stick passes, and limits the degree to which the stick can enter that housing. This type of dip stick is here illustrated in a typical form, but it will be apparent that many variations may be made therein, and that the wiper of the present invention, described below, could be used with many specifically different dip stick designs.

The wiper comprises a loop generally designated A, here disclosed as formed from a semi-rigid but resiliently distortable material such as cardboard, which may be provided with a covering of paper or metal foil. It may be formed from a single sheet the ends of which are overlapped and secured together at 8 in any appropriate manner, and is provided with flattened ends 10 and 12 so that the inner periphery of the loop, while considerably longer than the diameter of the intermediate dip stick portion 6, has a width which is much less than that diameter. Consequently when the loop A is positioned over the upper stick portion 4 it will encompass that portion and will rest upon the intermediate stick portion 6. The nature of the material of which the loop A is formed is such that it tends to resiliently assume this flattened condition. The loop A can, however, be distorted to a somewhat less flattened condition shown in FIG. 4, as by the application of finger pressure in the direction of the arrows 14. The length of the loop A will then decrease, but will still be greater than the diameter of the intermediate stick portion 6. The width of the loop A will increase, however, until, as shown in FIG. 4, it exceeds the diameter of the intermediate stick portion 6. In this condition the loop A can be moved downwardly over the intermediate stick portion 6 so as to encompass the lower stick portion 2 which is normally received in the crankcase. The force exerted in the direction of the arrows 14 is then released and the loop A will, either through the resiliency of the material of which it is formed, particularly at its flattened ends 10 and 12, or through action of any suitable resilient structure active thereon, resume its flattened condition. It may then be grasped as shown in FIGS. 5 and 6, pressed against the lower stick portion 2 and moved up and down thereover to wipe that stick portion. After this has been done the loop A is again caused to resume its longitudinally contracted condition shown in FIG. 4, it is moved up over the intermediate stick portion 6, and is then released. It will resume its flattened condition and remain above the intermediate stick portion 6, thus leaving the wiped lower stick portion 2 available for oil depth measurement. It is preferred that the inner surface of the loop A be defined by material particularly adapted for wiping, such as felt or blotting paper. In this regard attention is drawn particularly to FIG. 15, illustrating a two-ply construction in which the outer ply 3 is formed of foil-coated paperboard or cardboard which imparts to the loop A its desired resiliency and shape, the inner ply 5 being defined by felt or blotting paper.

As will be apparent from a comparison of FIGS. 3 and 6, the normal flattened condition of the loop A is such that at the end 10 thereof the depth of the loop is less than the width of the upper dip stick portion 4. Consequently when, as is preferred, the loop A is moved to the left as viewed in the figures until the upper dip stick portion 4 is received within the loop adjacent the end 10 thereof, the loop A will frictionally grip the stick portion 4 and will therefore be retained against accidental displacement even under the severe vibratory conditions to which it may be subjected. The loop A will therefore look like a flag attached to the dip stick (see FIG. 1) and will thus make unmistakable the location of the dip stick in the particular vehicle involved. When metal foil is used for at least the outer surface of the loop A, that foil, being reflective, will permit a person to find the dip stick even under conditions of minimum illumination, since even slight amounts of illumination will be reflected by the foil surface.

The alternative embodiments here illustrated embody refinements of structure adapted to facilitate the retention of the loop A on the upper dip stick portion 4 in desired stand-by position. In the embodiment of FIGS. 7 and 8 the lower surface of the loop A is cut away, at 16, to a distance sufficient for the intermediate dip stick portion 6 to be received therein. In addition, the upper portion of the loop is provided with an integral flap 18 adapted to be bent around the dip stick portion 4, thereby, because of its inherent resiliency and semi-rigidity, to frictionally grasp the dip stick portion 4. In FIG. 13 the loop is provided with a cut-away portion 16' of somewhat different shape from the cut-away portion 16 of FIG. 7, but serving the same purpose, and in the embodiment there illustrated a small magnet 20 is fastened to the surface of the loop, as by means of staple 22 (see FIG. 15) in such a position as to be magnetically attracted to and releasably engage the upper dip stick portion 4 when the loop A is properly in place thereon. These refinements could, of course, be used individually or in other combinations from those here specifically shown.

In the embodiment of FIGS. 9–12 the end 10 of the loop is encompassed by a clamping member 24 which may be formed of metal or plastic and which extends over substantially the entire height of the loop A but only a very small proportion of the length of the loop, this clamping member 24 imparting a large measure of rigidity to the portion thereof which it encompasses, the upper dip stick portion 4 being designed to be received within said clamp-encompassed portion when the loop A is in stand-by position, as shown in FIGS. 9 and 10. The loop A, urged by the clamping member 24, will normally tend to assume a somewhat narrower shape at its end 10 than the thickness of the stick portion 4 (see FIG. 11), and as a result when the loop A is in stand-by condition it will be firmly clamped to the stick portion 4 and thus extremely reliably retained in position. For moving the loop A past the intermediate stick portion 6 distortion is accomplished as in the other embodiments, except that, as best shown in FIG. 12, that distortion will occur only over the unclamped area of the loop A because of the high degree of rigidity of the clamping member 20.

Thus the wiper of the present invention comprises a simple sheet of inexpensive material, whether of single or multi-ply construction, so shaped as to normally retain itself on the handle portion 4 of the dip stick, there to perform its secondary functions of locating, advertising and/or record keeping. It remains with the dip stick and consequently is always available to perform its primary function, the wiping of the lower portion 2 of the dip stick. It may be moved to that lower dip stick portion 2 by being distorted sufficiently to pass over the intermediate dip stick portion 6, and after having performed its wiping function it can then be restored to its stand-by position. When it has been used for so many wiping operations as to be inefficient, it can be readily removed and replaced.

While but a minimal number of embodiments have been here specifically disclosed, it will be apparent that many variations may be made therein, all within the scope of my invention as defined in the following claims.

I claim:

1. In combination, a wiper and a dip stick having upper and lower portions separated by a wider intermediate portion, said wiper comprising an essentially rigid but resiliently distortable continuous loop adapted to be received over and to substantially surround said stick, said loop normally assuming a flattened configuration longer in length but narrower in width than said intermediate portion of said dip stick and being resiliently distortable to a less flattened configuration larger in both length and width than said intermediate portion of said dip stick, the inside surface of said loop being defined by material suitable for wiping said dip stick.

2. The combination of claim 1, in which said loop is cut-away on its lower surface adjacent one flattened end thereof, whereby when said loop is positioned above and resting on said intermediate portion of said dip stick, said intermediate dip stick portion seats within said cut-away.

3. The combination of claim 2, in which said loop is provided, adjacent said flattened end and above said cut-away, with means for detachably engaging said upper portion of said dip stick.

4. The combination of claim 2, in which said loop is provided, adjacent said flattened end and above said cut-away, with magnetic means detachably engageable with said upper portion of said dip stick.

5. The combination of claim 2, in which said loop is provided, adjacent said flattened end and above said cut-away, with a flap integral with said loop proper and resiliently distortable into detachable frictional engagement with said upper portion of said dip stick.

6. The combination of claim 1, in which said loop is provided, adjacent one flattened end thereof, with means for detachably engaging said upper portion of said dip stick.

7. The combination of claim 6, in which means comprises a magnet.

8. The combination of claim 6, in which said means comprises a flap integral with said loop proper and resiliently distortable into frictional engagement with said dip stick.

9. The combination of claim 1, in which said loop comprises an outer ply of metal foil and an inner ply of absorbent material.

10. The combination of claim 1, in which one flattened end of said loop normally assumes a width less than the thickness of the upper portion of said dip stick, whereby when said dip stick portion is received therein, said loop end will frictionally grip said dip stick portion.

11. The combination of claim 1, in which one flattened end of said loop is received within a clamping member which imparts thereto a width less than the thickness of the upper portion of said dip stick, whereby, when said dip stick portion is received therein, said loop end will frictionally grip said dip stick portion.

12. The combination of claim 1, in which one flattened end of said loop is received within a clamping member which imparts thereto a width less than the thickness of the upper portion of said dip stick, whereby, when said dip stick portion is received therein, said loop end will frictionally grip said dip stick portion, said clamp covering only a minor proportion of the length of said loop, the unclamped portion of said loop being distortable as described.

References Cited in the file of this patent

UNITED STATES PATENTS

| | | |
|---|---|---|
| 1,770,300 | Davis | July 8, 1930 |
| 1,872,878 | Bragg | Aug. 23, 1932 |
| 2,641,793 | Wilm | June 16, 1953 |
| 2,773,277 | Souter | Dec. 11, 1956 |

FOREIGN PATENTS

| | | |
|---|---|---|
| 115,669 | Australia | Aug. 4, 1942 |